PROCESS OF VAPOR DEPOSITING AND ANNEALING VAPOR DEPOSITED LAYERS OF TIN-GERMANIUM AND INDIUM GERMANIUM METASTABLE SOLID SOLUTIONS

Filed Sept. 19, 1963

INVENTORS
CHARLES CHIOU
RICHARD A. CONNELL
DONALD P. SERAPHIM

BY George Baron
ATTORNEY

United States Patent Office 3,244,557

Patented Apr. 5, 1966

3,244,557

PROCESS OF VAPOR DEPOSITING AND ANNEALING VAPOR DEPOSITED LAYERS OF TIN-GERMANIUM AND INDIUM-GERMANIUM METASTABLE SOLID SOLUTIONS

Charles Chiou, Yorktown Heights, N.Y., Richard A. Connell, Shawnee Mission, Kans., and Donald P. Seraphim, Bedford Hills, N.Y., assignors to International Business Machines Corporation, New York, N.Y., a corporation of New York Filed Sept. 19, 1963, Ser. No. 309,956
4 Claims. (Cl. 117—212)

Figure 1:
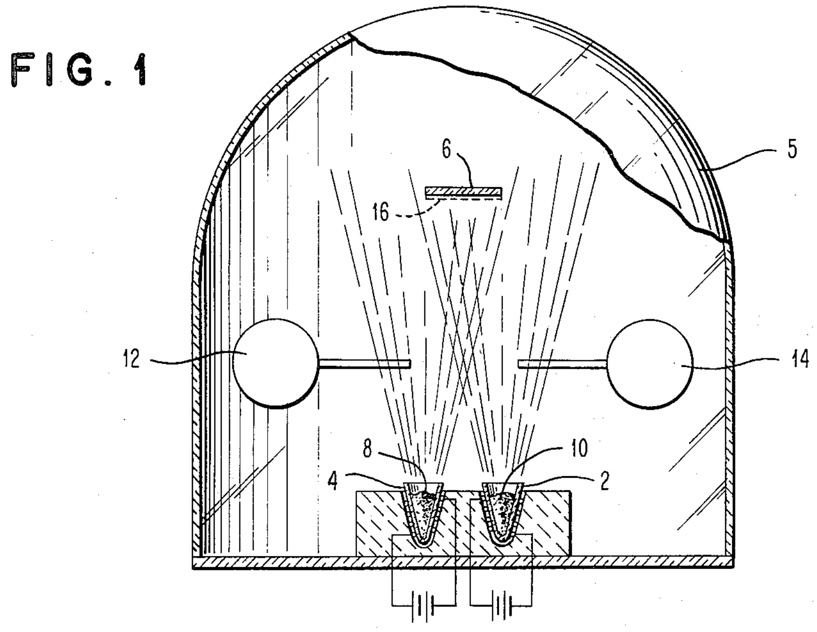

This invention relates to thin film superconductive memory cells and more particularly to a thin film persistent memory cell operating on the principle of trapped flux.

As is set forth in the prior art, as evidenced by the article entitled, "Trapped-Flux Superconducting Memory" by J. W. Crowe and "An Analysis of the Operation of a Persistent-Supercurrent Memory Cell" by R. L. Garwin appearing in the October 1957 issue of the IBM Journal of Research and Development, Vol. 1, No. 4, pages 294 to 308, superconductive memory cells have been employed using the principle of trapped flux. In general, a large sheet of material, constructed of 1000A. thickness of tin, is kept at temperatures near absolute zero. Such tin is impregnated with impurities or holes whereby the impurities or holes constitute flux-trapping centers. Broadly speaking, when current is applied to a drive wire disposed near the thin film of tin, the magnetic field created about said wire is applied to the tin. As the magnetic field grows in amplitude, the superconductive tin sheet repels such magnetic field. However, the magnetic field, when it reaches the critical field of the tin, drives the latter resistive, permitting the magnetic field surrounding the drive wire to penetrate the now resistive tin. The current in the wire is diminished, and during such diminution, the tin returns to its superconductive state. During the diminution or current decay, a persistent current is set up about impurities or holes within the tin sheet, causing flux to be trapped in such holes or impurities. When the drive current has completely terminated, the trapped flux serves to support persistent currents about the holes or impurities. The direction of current flow of such persistent current is used as a means for indicating the storage of binary information; for example, clockwise persistent current would be designated as a storage of a "1" and counterclockwise persistent current would be designated as storage of a "0."

It has been found in the construction of such superconductive continuous sheet memories that the presence of impurities or holes may weaken the total structure of the sheet. The present invention employs a continuous sheet wherein the holes are replaced by non-metallic material deposited along with the tin that forms the superconductive sheet so that there is no diminution in the strength of the continuous sheet film. The novel sheet film is constructed by the concurrent deposit of metallic and non-metallic material selected to be completely insoluble in the metal. The film is a metastable mixture or metastable solid solution, of metallic and non-metallic material when deposited. Upon annealing, the non-metallic material precipitates out so as to form normal spots analogous to the holes previously used in making sheet film superconductive storage films.

In carrying out the invention, tin and germanium are simultaneously deposited by various deposition techniques on to a suitable surface such as glass. Then, by a given technique of deposition to be described hereinafter, germanium forms 35 At. percent of the mixture of tin and germanium. After deposition, the glass substrate is heated to a temperature of 110° C. for 42 hours in a vacuum of $10^{-4}$ mm. and then cooled to room temperature while in the vacuum. During such heating, the germanium precipitates out, such precipitated particles of germanium being of the order of one micron. These germanium precipitates act as flux storing centers much like the holes or impurities employed with present day continuous sheet films made of tin.

Although germanium is characterized as a metal, its electrical conductivity is very much less than either indium or tin so that for the purpose of this invention it may be considered a non-metal or a semiconductor.

It is an object of this invention to make an improved continuous sheet film superconductive memory plane.

It is yet another object to make a continuous sheet film wherein the mode of manufacture is simple.

It is still another object to make sheet film memory planes having flux-trapping centers without the need to employ physical voids or holes in such sheet film memories.

The foregoing and other objects, features and advantages of the invention will be apparent from the following more particular description of preferred embodiments of the invention, as illustrated in the accompanying drawing.

Figure 2:
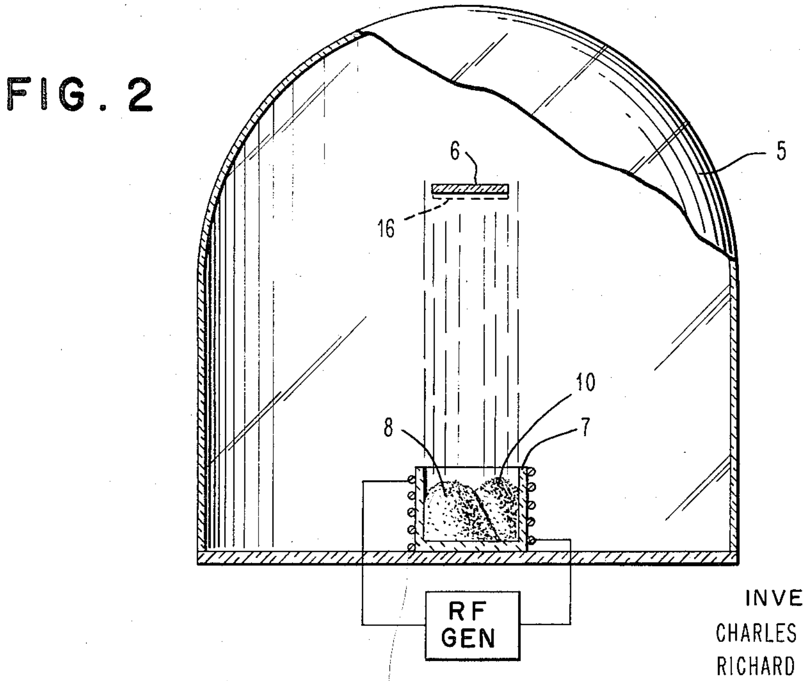

In the drawing:

FIGURE 1 depicts one method of forming the flux-trapping plane that forms the present invention, and FIGURE 2 depicts another method of forming a flux-trapping plane.

FIGURE 1 illustrates one manner in which the invention is to be carried. Boat 2 and boat 4 are conventional containers for holding material to be evaporated in a vacuum chamber 5 onto a surface illustrated as glass 6. It is understood that glass 6 can be replaced by mica, resin or any other insulated base to which metal can adhere. The boats 2 and 4 contain respectively tin 8 and germanium 10. When the two boats are heated, the amount of materials used are selected so that for a given thickness of sheet film, 65 At. percent of the deposition will be tin and 35 At. percent will be germanium. The amounts being deposited onto surface 6 can be controllable by using rate monitors shown schematically as 12 and 14.

For the very thin films deposited, namely, of the order of 800–2000A. thick, the germanium atoms are intimately mixed with the tin atoms but are not soluble therein. The subsequent heating process serves to precipitate the germanium from the tin, but the precipitated germanium still adheres to the tin so that particles of germanium act as insulated elements in an otherwise conductive plane. After the deposition process has been completed, the glass base 6 and its deposited film 16 are removed and annealed. A preferred annealing consists of heating the glass 6 and film 16 to a temperature of 110° C. and maintaining such temperature for 42 hours in a vacuum of about $10^{-4}$ mm. and then gradually returning the film 16 and glass base 6 to room temperature.

By the evaporation of germanium and tin simultaneously on a relatively cold substrate, the atoms of both substances are trapped so that the phases of both elements are thoroughly mixed, i.e., in an extremely fine state of subdivision. In the vapor deposition art, precipitation takes place when the germanium phase particles coalesce and form microscopic particles which separate from the mixture during annealing. Such coalesced particles are referred to as precipitates.

While germanium and tin have been given as examples of materials that can be employed for manufacturing a continuous sheet superconductive memory plane, germanium can be employed with indium; in such case, the tin in boat 2 would be replaced by indium. Germanium has been found to be particularly suitable for making flux-trapping planes because even should there be a variation as much as 5–40% in the amount of germanium deposited with the tin, the critical temperature of the sheet film so produced remains between 3.75° K. and 3.90° K. The same variation applies to indium when combined with germanium, but the critical temperature remains close to the critical temperature of indium, which is 3.4° K.

FIGURE 2 sets out schematically an alternate way of preparing the flux-trapping sheet film 16. In the method of FIGURE 2, a mixture of tin 8 and germanium 10 is placed in a single boat, such mixture being composed of 65% tin and 35% germanium by weight. The evaporation temperature of tin is about 1400° C. and that of germanium is 1500° C.–1600° C. In order to deposit the tin and germanium simultaneously, the temperature of the boat is first brought to 1000° C. and then quickly increased to 1600° C. Radio-frequency heating technique was used to attain this rapid heating. The completed film 16 will comprise about 60 At. percent normal conducting material (tin or indium) and 40 At. percent insulated material (germanium). Since the germanium evaporates more slowly than tin, 35% by weight (which is 40 At. percent) is needed in the boat to assure 35 At. percent of germanium in the finally deposited film. After annealing the film as already described, the germanium precipitates thus act effectively as if they were holes or voids in an otherwise normally conducting plane.

The employment of germanium in conjunction with tin, indium, or other superconductive material in the formation of a flux-trapping storage plane has resulted in a relatively continuous sheet film that avoids the need for holes or voids, in order to obtain flux-trapping centers. Germanium also has the advantage that wide variations in its proportions with respect to tin or indium can exist without substantially changing the critical temperature of the sheet film deposited.

While the invention has been particularly shown and described with reference to preferred embodiments thereof, it will be understood by those skilled in the art that various changes in form and details may be made therein without departing from the spirit and scope of the invention.

What is claimed is:

1. A method of making a flux-trapping superconductive plane suitable as a memory device comprising the steps of:

(1) supporting a source of tin and germanium in a container in an evacuated chamber,
(2) preheating said container to a temperature below the evaporating temperature of either tin and germanium,
(3) suddenly heating said container to a temperature above the evaporating temperatures of both tin and germanium to cause evaporation of both materials,
(4) simultaneously depositing both evaporants onto an insulated substrate,
(5) maintaining said substrate at a temperature to effect the deposition of both evaporants, and
(6) annealing the thus deposited layer of tin and germanium to form globules of the germanium within the deposited plane.

2. A method of making a flux-trapping superconductive plane suitable as a memory device comprising the steps of:

(1) supporting a source of tin and germanium in a conductor in an evacuated chamber, said tin being substantially 60–70% and germanium 40–30% by atomic percent,
(2) preheating said conductor to a temperature below the evaporating temperature of either tin and germanium, (3) suddenly heating said conductor to a temperature above the evaporating temperatures of both tin and germanium to cause evaporation of both materials,
(4) simultaneously depositing both evaporants onto an insulated substrate,
(5) maintaining said substrate at a temperature to effect the deposition of both evaporants, and
(6) annealing the thus deposited layer of tin and germanium to a temperature of 110° C. for approximately 42 hours in a vacuum of the order of $10^{-4}$ mm. to form globules of the germanium within the deposited plane.

3. A method of making a flux-trapping superconductive plane suitable as a memory device comprising the steps of:

(1) supporting a source of indium and germanium in a container in an evacuated chamber,
(2) preheating said container to a temperature below the evaporating temperature of either indium and germanium,
(3) suddenly heating said container to a temperature above the evaporating temperature of both indium and germanium,
(4) simultaneously depositing both evaporants onto an insulated substrate, and
(5) annealing the thus deposited layer of indium and germanium.

4. A method of making a flux-trapping superconductive plane suitable as a memory device comprising the steps of:

(1) supporting a source of indium and germanium in a conductor in an evacuated chamber, said indium being substantially 60–70% and germanium 40–30% by atomic percent,
(2) preheating said conductor to a temperature below the evaporating temperature of either indium and germanium,
(3) suddenly heating said conductor to a temperature above the evaporating temperatures of both indium and germanium to cause evaporation of both materials,
(4) simultaneously depositing both evaporants onto an insulated substrate,
(5) maintaining said substrate at a temperature to effect the deposition of both evaporants, and
(6) annealing the thus deposited layer of indium and germanium to a temperature of 110° C. for approximately 42 hours in a vacuum of the order of $10^{-4}$ mm. to form globules of the germanium within the deposited plane.

References Cited by the Examiner

UNITED STATES PATENTS

| | | | |
|---|---|---|---|
| 2,759,861 | 8/1956 | Collins et al. | 117—227 |
| 2,852,415 | 9/1958 | Colbert et al. | 117—227 |
| 2,953,484 | 9/1960 | Tellkamp | 117—227 |
| 2,994,621 | 8/1961 | Hugle et al. | 117—227 |
| 3,015,587 | 1/1962 | MacDonald | 117—227 |
| 3,018,198 | 1/1962 | Olson et al. | 117—227 |
| 3,055,775 | 9/1962 | Crittenden et al. | 75—175 |
| 3,058,851 | 10/1962 | Kahan | 117—212 |
| 3,085,913 | 4/1963 | Caswell | 117—212 |

OTHER REFERENCES

Hansen: Constitution of Binary Alloys, pages 764, 765, 775 and 776.

Lynton: Superconductivity, John Wiley and Sons, Inc., New York, 1962, pages 132–139.

DAVID L. RECK, *Primary Examiner.*

HYLAND BIZOT, *Examiner.*